United States Patent [19]
Leber

[11] 3,760,039
[45] Sept. 18, 1973

[54] CIS-PHOSPHORIC ACID AMIDE ESTERS

[75] Inventor: Jean-Pierre Leber, Basel, Switzerland

[73] Assignee: Sandoz Ltd., Basel, Switzerland

[22] Filed: Nov. 12, 1969

[21] Appl. No.: 876,086

Related U.S. Application Data

[63] Continuation-in-part of Ser. No. 829,747, June 2, 1969, abandoned.

[30] Foreign Application Priority Data

June 6, 1968 Switzerland.......................... 8521/68
Mar. 19, 1969 Switzerland.......................... 4133/69
Apr. 21, 1969 Switzerland.......................... 5974/69

[52] U.S. Cl.............. 260/941, 204/158 R, 260/964, 260/973, 260/984, 260/989, 424/212
[51] Int. Cl............................ C07f 9/24, A01n 9/36
[58] Field of Search...................... 260/941

[56] References Cited
UNITED STATES PATENTS

3,053,729  9/1962  Sun .............................. 260/941 UX
3,065,257  11/1962  Erikson et al...................... 260/941

FOREIGN PATENTS OR APPLICATIONS

963,300  7/1964  Great Britain...................... 260/941

OTHER PUBLICATIONS

Kabachnik et al., "J. Gen. Chem. of the U.S.S.R.," Vol. 30, No. 7, (July 1960), pp. 2201–2205.
Newallis et al., "J. Agr. Food. Chem.," Vol. 15, No. 5, (1967), pp. 941–942.

*Primary Examiner*—Lewis Gotts
*Assistant Examiner*—Anton H. Sutto
*Attorney*—Gerald D. Sharkin, Frederick H. Weinfeldt, Robert S. Honor, Walter F. Jewell and Richard E. Vila

[57] ABSTRACT

Insecticidally and acaricidally active phosphoric acid amides of formula:

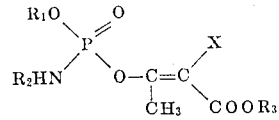

in which $R_1$, $R_2$ and $R_3$, which may be the same or different, each represent alkyl containing from one to five carbon atoms, and X represents a hydrogen or a chlorine atom, and in which the —$CH_3$ is cis to the —$COOR_3$ in the crotonic acid moiety.

29 Claims, No Drawings

CIS-PHOSPHORIC ACID AMIDE ESTERS

This application is a continuation in part of application Ser. No. 829,747 filed June 2, 1969, now abandoned.

The present invention relates to new phosphoric acid amide esters and to insecticidal and acaricidal compositions containing them.

The invention relates to compounds of formula I,

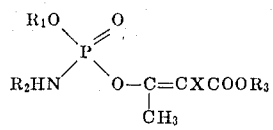

I in which
R$_1$, R$_2$ and R$_3$ which may be the same or different each represent an alkyl group containing from 1 to 5 carbon atoms, and
X represents a hydrogen or a chlorine atom.

According to our invention we provide compounds of formula Ib,

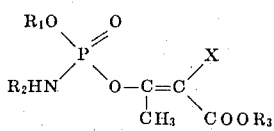

Ib in which
R$_1$, R$_2$, R$_3$ and X are as defined above, and in which the —CH$_3$ group is cis to the —COOR$_3$ group in the crotonic acid moiety.

According to our invention we also provide processes for the production of compounds of formula Ib which comprise a. irradiation of a compound of formula Ia,

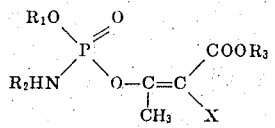

Ia in which
R$_1$, R$_2$, R$_3$ and X are as defined above, the —CH$_3$ group being trans to the —COOR$_3$ group in the crotonic acid group,
with ultraviolet light, b. reaction of a compound of formula II,

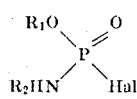

II in which
R$_1$ and R$_2$ are as defined above, and Hal represents a bromine or chlorine atom,
with a compound of formula III,

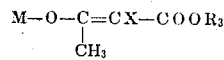

III in which
X and R$_3$ are as defined above, and
M represents a salt-forming atom or a salt-forming group,
in a solvent of high dielectric constant, c. reaction of a compound of formula II with a compound of formula IV, $$CH_3COCHXCOOR_3$$

IV in which
R$_3$ and X are as defined above, in a solvent comprising pyridine or a base having a pK value similar to that of pyridine, d. reacting a compound of formula V,

V in which
R$_1$, R$_3$, X and Hal are as defined above, and in which the —CH$_3$ group is cis to the —COOR$_3$ group,
with a compound of formula VII, $$R_2 NH_2$$

VII in which
R$_2$ is as defined above, in the presence of an acid acceptor and in a solvent which is inert under the reaction conditions, or e. reacting a compound of formula VIII,

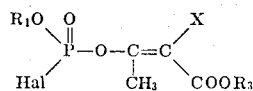

VIII in which
R$_2$, R$_3$, X and Hal are as defined above, and in which the —CH$_3$ group is cis to the -COOR$_3$ group,
with a compound of formula VI,

VI in which
R$_1$ is as defined above, and
Q represents a hydrogen or an alkali metal atom, with the proviso that when Q represents a hydrogen atom the reaction is carried out in the presence of an acid acceptor.

In the process (a) the compound of formula Ia preferably as a mixture with the corresponding cis isomer of formula Ib, is subjected to ultraviolet light irradiation. The irradiation may conveniently be carried out in an inert organic solvent, e.g. hexane, at about room temperature (20°C). The cis compound (Ib) may be obtained in pure form from the resulting cis-enriched mixture of geometric isomers, for example, by fractional distillation under vacuum. The cis isomer distils over as the fraction with higher boiling point, the trans isomer (Ia) comprising the lower-boiling fraction. The cis form may also be obtained in pure form from the cis-enriched mixture by other methods conventional for the separation of cis/trans isomers, e.g. fractional crystallisation, counter-current distribution and column chromatography.

In process (b) the solvent of high dielectric constant may be a hydrogen bridge forming protio or aprotic solvent, e.g. water, or homogeneous or heterogeneous mixtures of water with one or more other suitable solvents, e.g. dimethyl formamide, hexamethylphosphoric acid triamide or dimethyl sulphoxide. Other solvents having a relatively high dielectric constant, e.g. dimethyl cellosolve, tetramethyl-ethylene diamine or 2,2'-dicyano-diethyl ether, may likewise be used as reaction medium. The reaction may be carried out at a temperature of −10°C to the boiling point of the solvent, preferably at −5° to +15°C. The salt-forming atom or group may be, for example, an alkali metal atom, e.g. a sodium atom.

In process (c) the reaction may be carried out by adding a compound of formula II at about 0°C to a compound of formula IV in pyridine and stirring the mixture at 0°C for 40 to 60 hours. The compound of formula IV may also exist as its enolic tautomer and this enolic tautomer is included within the definition of the compound of formula IV.

In process (d) the solvent which is inert under the reaction conditions may be, for example, an aromatic hydrocarbon, e.g. toluene or xylene, a halogenated hydrocarbon, e.g. chlorobenzene or chloroform, or dioxane. The reaction may be carried out at a temperature of −20° to +50°C, preferably at −10°C to room temperature (20°C), during the course of ½ to 2 hours. It is preferred to use an approximately equimolar amount of the amine of general formula VII, and of the compound of formula V. It is also preferred to use an approximately equimolar amount of an acid acceptor, for example a tertiary nitrogen base, e.g. triethylamine, trimethylamine, dimethylaniline, diethylaniline, or sodium carbonate. The acid acceptor is conveniently added to the reaction mixture during the course of ½ to 2 hours. The solvent may be removed from the reaction mixture under vacuum at a bath temperature of approximately 20° to 50°C when the reaction has been completed.

Process (e) may be carried out by adding a mixture of an alcohol of formula VI and an acid acceptor to a compound of formula VIII, in an excess of the alcohol of formula VI or preferably in a solvent which is inert under the reaction conditions, e.g. chloroform, at room or elevated temperature. The reaction mixture may be stirred at room temperature for about 50 to 70 hours and the resulting compound of formula Ib may be obtained by working up in the usual manner. It is preferred to use approximately equimolar amounts of the alcohol of formula VI, of the compound of formula VIII and of the acid acceptor. Examples of suitable acid acceptors are those described above for process (d). The reaction may likewise be effected with an alkali metal alcoholate, in place of an alcohol of formula VI and an acid acceptor.

The compounds of formula Ib may be recovered and purified from the reaction products of the above processes by fractional vacuum distillation.

The phosphoric acid amide esters of formula Ib, produced in accordance with the invention, are oils which can be distilled in a high vacuum without decomposition and which may be characterised in conventional manner by their physical constants. They are soluble in many organic solvents and may, as suitable, formulations, be readily emulsified in water.

The preferred compounds of formula Ib are:

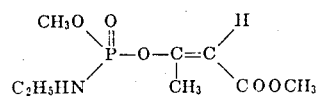

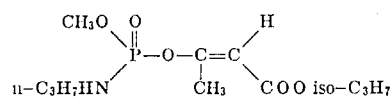

and

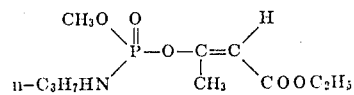

The products obtained in accordance with the process of the invention, comprise compounds of formula I predominantly having a cis configuration (i.e. compounds of formula Ib) in the crotonic acid radical.

The exact composition of mixtures of cis and trans compounds of formula Ib and Ia respectively may be conveniently determined by quantitative paper chromatography, whereby the paper zones containing the individual geometric isomers are used for the determination of phosphorus.

A mixture of 2 parts of formamide and one part of dimethyl formamide may be used for the impregnation of the chromatography paper. The development of the chromatogram may be effected with a mixture of 2 parts of toluene and 3 parts of isooctane. A pure separation of the two isomers is obtained, whereby the cis isomer (Ib) generally has the higher Rf value as compared with the trans isomer.

The analytical determination of the geometric isomers may also be effected by gas chromatography or column chromatography.

It can be shown by means of the NMR spectrum that the cis compounds are obtained in accordance with the processes described above [see Journal of Agriculture and Food Chemistry 15 (1967) page 940 ff.]. The compounds of formula Ib, in which X represents hydrogen, show a characteristic multiplet at about 6 ppm (tetramethyl silane). When X signifies a chlorine atom, the relative proportion of the cis compound may be determined from the doublet at about 2.5 ppm.

The compounds of formula Ia, i.e. those having the trans configuration in the crotonic acid radical, together with some of the compounds of formula Ib, may be obtained by reacting a compound of general formula II with a compound of general formula III, in the presence of an inert solvent or suspension agent of low dielectric constant, e.g. toluene, or xylene, preferably at about room temperature.

The compounds of general formula II may be produced by reacting a compound of general formula IX,

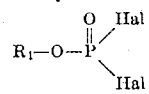

IX in which
R₁ and Hal have the above significances, with approximately 1 mole of an amine of formula VII, in the presence of an acid acceptor, which may be, for example, a tertiary amine, e.g. trimethylamine, triethylamine or pyridine. The reaction is conveniently effected in an inert solvent, at a tempprature below room temperature, e.g. −30° to +15°C.

Compounds of formula V may be made by reacting a compound of formula XII,

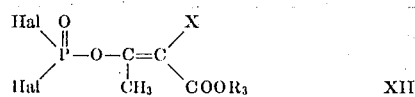   XII in which Hal, R₃ and X are as defined above and in which the —CH₃ group is cis to the —COOR₃ group, with one mole of a compound of formula VI in analogous manner to that set out for process (e) above.

The compounds of formula XII may be made by reacting a phosphorus oxyhalide, e.g. phosphorus oxychloride, with a compound of formula IV in the presence of an acid acceptor.

Compounds of formula VIII may be made by (a) reacting a compound of formula XII with an approximately equimolar proportion of a compound of formula VII, in the presence of an acid acceptor, or (b) reacting a compound of general formula X,

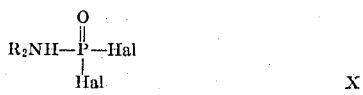   X in which
R₂ and Hal are as defined above, with an approximately equimolar proportion of a compound of forumla IV, in the presence of an acid acceptor.

The compounds of general formula Ib are useful insecticides and acaricides. They have an effect against chewing and sucking insects and good effect against spider mites. The compounds of the invention have a low toxicity in warm-blooded animals and a low phytotoxicity. The new compounds can be used as pesticides in agriculture, inhabited rooms, cellars, attics, stables, etc. The compounds can also be used in protecting living organisms of the plant and animal kingdom in their different forms of development, against insects, acarids and nematodes.

The combatting of insects and acarids can be carried out for example, by treating the objects to be protected with the active agent, preferably in combination with an inert diluent or carrier. For use as a plant-protecting agent or as a pesticide the compound of the invention may be prepared in the form of a dusting or spraying agent, e.g. as a solution or dispersion in water or a suitable organic solvent, e.g. alcohol, petroleum, tar distillates etc., and preferably in combination with an emulsifying agent, e.g. a liquid polyglycol ether derived from a high molecular weight alcohol, mercaptan or alkylphenol and an alkylene oxide. Suitable organic solvents, e.g. ketones, aromatic, optionally halogenated hydrocarbons, mineral oils etc., may also be added to the mixture as solution aids.

The spraying and dusting agents may contain the usual inert carrier materials, e.g. talc, diatomaceous earth, bentonite, pumice, cellulose derivatives an the like, and the usual adhesives and wetting agents to improve adhesiveness and wettability.

The active material of the invention may be present in the formulations as a mixture with other known agents. Formulations suitable for use in the application of a compound of formula I to a locus generally containg between 0.01 and 90 percent, and preferably between 0.1 and 20 percent by weight of active agent depending upon the method of application. Concentrates suitably contain between about 2 percent and 90 percent and preferably between 5 percent and 50 percent by weight of active ingredient.

The compounds of formula Ib, suitably in the form of a formulation as described above, e.g. as a spray or a dust can be applied to the locus to be protected from the insects or acarids, e.g. to growing crops, trees or bushes. Such application can be made directly to the locus during the period of insect or acarid infestation, or alternatively the application can be made in advance of an anticipated insect or acarid infestation to prevent such infestation. For example, the compositions can be applied as foliar sprays or dusts, but can also be applied as sprays or dusts directed to the surface of the soil.

The invention is illustrated, but in no way limited by the following Examples in which the temperatures are in °C.

Formulations containing the compounds of the invention may be produced in know manner, e.g. by Example (a) mixing 25 parts by weight of compound of formula Ib with 25 parts by weight of isooctylphenyldecaglycol ether and 50 parts by weight of xylene, whereby a clear soltuion is obtained which has a good emulsifying power in water. The concentrate is diluted with water to the desired concentration before use. Example (b) mixing 25 parts by weight of a compound of formula Ib with 30 parts by weight of isooctylphenyloctaglycol ether and 45 parts by weight of a petroleum fraction having a boiling point of 210°-280° (D 20°C:0.92). The concentrate is diluted with water to the desired concentration before use.

Example (c) mixing 50 parts by weight of a compound of formula Ib with 50 parts by weight of isooctylphenyloctaglycol ether. A clear concentrate is obtained which may be readily emulsified in water and which is diluted with water to the desired concentration before use.

The following Application examples illustrate the insecticidal and acaricidal effect of the compounds produced in accordance with the processes of the invention.

EXAMPLE (i) Insecticidal effect against *Bruchidius obtectus* (bean weevils) Contact effect.

0.1 to 0.2 cc of a diluted emulsion produced as in Example (a) containing 0.01 or 0.002 percent of active agent are sprayed with a spraying nozzle into a number of 7 cm diameter Petri dishes. After drying the covering for about 4 hours, 10 Bruchidius imagoes are placed in each dish which is covered with a cover of fine mesh brass wire grating. The animals are kept without food at room temperature.

After 48 hours the rate of mortality is determined. The mortality rate is indicated as a percentage. 100 percent means that all the bean weevils were killed, 0 percent means that no bean weevil was killed. The results are given in the following Table 1.

TABLE 1

| Active agent | Rate of mortality in % after 48 hours | |
|---|---|---|
| | Conc.: 0,01% | 0,002% |
| 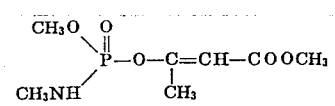 | 100 | 100 |
| 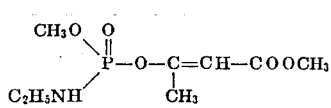 | 100 | 100 |
| 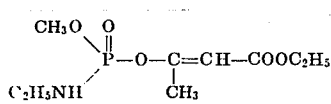 | 100 | 100 |
| 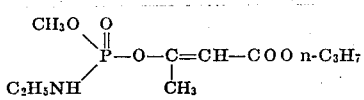 | 100 | 100 |
| 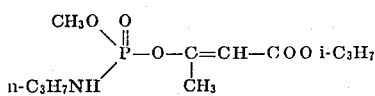 | 100 | 100 |

EXAMPLE (ii): Insecticidal effect against Aphis fabae (black bean aphid) Direct contact effect.

Broad bean plants (Vicia faba) are sprayed to run off with a diluted spraying liquor made as in Example (a) having a concentration of active agent of 0.01 percent. The broad bean plants are strongly infected with all the forms of development of the black bean aphid (Aphis fabae). After two days the rate of mortality is determined. The mortality rate is indicated as a percentage, 100 percent means that all the bean aphids were killed, 0 percent means that no bean aphid was killed. The results are indicated in the following Table 2.

TABLE 2

| Active agent | Rate of mortality in % after two days |
|---|---|
| | Conc.: 0,01% |
| $\begin{array}{c}CH_3O\\ \diagdown\\ \phantom{CH_3NH}P-O-C=CH-COOCH_3\\ \diagup \phantom{P} \vert\\ CH_3NH \phantom{P-O-C=} CH_3\end{array}$ — with O double bond | 100 |
| $\begin{array}{c}CH_3O\\ \diagdown\\ \phantom{C_2H_5NH}P-O-C=CH-COOCH_3\\ \diagup \phantom{P} \vert\\ C_2H_5NH \phantom{P-O-C=} CH_3\end{array}$ | 100 |

EXAMPLE (iii): Insecticidal effect against Dysdercus fasciatus sign. (red bug) Contact effect.

0.1 to 0.2 cc of an emulsion containing 0.01 percent of active agent are sprayed with a spraying nozzle into a number of 9 cm diameter Petri dishes. After drying the covering for about 4 hours, 10 Dysdercus larvae in the fifth stage are placed in each dish which is covered with a lid of fine mesh brass wire grating, on which a cotton plug soaked in water is placed.

After 6 days the rate of mortality is determined. The mortality rate is indicated as a percentage. 100 percent means that all the red bugs were killed, 0 percent means that no red bug was killed. The evaluation is shown in the following Table 3.

TABLE 3

| Active agent | Rate of mortality in % after 6 days |
|---|---|
| | Conc.: 0,01 % |
| $\begin{array}{c}CH_3O\\ \diagdown\\ P-O-C=CH-COOC_2H_5\\ \diagup \phantom{P} \vert\\ C_2H_5NH \phantom{P} CH_3\end{array}$ | 100 |
| $\begin{array}{c}CH_3O\\ \diagdown\\ P-O-C=CH-COO\ n\text{-}C_3H_7\\ \diagup \phantom{P} \vert\\ C_2H_5NH \phantom{P} CH_3\end{array}$ | 100 |
| $\begin{array}{c}CH_3O\\ \diagdown\\ P-O-C=CH-COO\ i\text{-}C_3H_7\\ \diagup \phantom{P} \vert\\ n\text{-}C_3H_7NH \phantom{P} CH_3\end{array}$ | 100 |
| $\begin{array}{c}C_2H_5O\\ \diagdown\\ P-O-C=CH-COOC_2H_5\\ \diagup \phantom{P} \vert\\ i\text{-}C_3H_7NH \phantom{P} CH_3\end{array}$ | 100 |

EXAMPLE (iv): Acaricidal effect against Tetranychus telarius (spider mite) Contact effect.

Leaf disks of bean plants (Phaseolus vulgaris), each containing 20–30 mites (larvae and adults) are immersed for 3 seconds in a diluted liquor produced as in Example (a) (concentration 0.05 or 0.01 percent of active agent) and are then placed in a dish. The dish is covered with moistened filter paper at an oblique angle so that a slight aeration is possible. After 48 hours the live and dead mites are counted out under a binocular magnifying glass. The mortality is indicated as a percentage in the following Table 4.

TABLE 4

| Active agent | Rate of mortality in % after 2 days | |
|---|---|---|
| | Conc.: 0,05 % | 0,01 % |
| $\begin{array}{c}CH_3O\quad O\\ \diagdown\|\\ P-C=CH-COOCH_3\\ \diagup\quad\|\\ CH_3NH\quad CH_3\end{array}$ | 100 | 95 |
| $\begin{array}{c}CH_3O\quad O\\ \diagdown\|\\ P-O-C=CH-COOCH_3\\ \diagup\quad\|\\ n\text{-}C_3H_7NH\quad CH_3\end{array}$ | 100 | 95 |

EXAMPLE (v): Insecticidal Effect against Aphis fabae Systemic effect.

Broad bean plants having a height of 15–20 cm and planted in 6 cm diameter plastic pots are used to determine the systemic effect. The earth of each pot is treated with 50 cc of a diluted liquor produced as in Example (a), having an active agent concentration of 0.02, 0.0004 or 0.00008 percent, taking care that the plant parts above the earth are not sprayed. The plants are subsequently kept at a hothouse temperature under artificial light. Two days after treatment two small cages, each containing five wingless imagos and larvae of Aphis fabae, are attached to each plant. Five days after treatment, the live and dead aphids are counted out. Mortality is indicated as a percentage, in accordance with Abbott's method, J. Econ. Entomol. 18 [1925] pages 265–267. Each value is the average of four tests for each concentration.

TABLE 5

| Active agent | systemic effect against Aphis fabae | | |
|---|---|---|---|
| | Conc.: 20 ppm | 4 ppm | 0,8 ppm |
| $\begin{array}{c}CH_3O\quad O\\ \diagdown\|\\ P-O-C=CH-COOCH_3\\ \diagup\quad\|\\ CH_3NH\quad CH_3\end{array}$ | 100 | 100 | |
| $\begin{array}{c}CH_3O\quad O\\ \diagdown\|\\ P-O-C=CH-COOCH_3\\ \diagup\quad\|\\ C_2H_5NH\quad CH_3\end{array}$ | 100 | 100 | 75 |
| $\begin{array}{c}C_2H_5O\quad O\\ \diagdown\|\\ P-O-C=CH-COOC_2H_5\\ \diagup\quad\|\\ i\text{-}C_3H_7NH\quad CH_3\end{array}$ | 100 | 100 | 65 |

The following Examples illustrate the production of the compounds of formula 1b.

Example 1: 0-(2-Carbethoxy-1-methyl-vinyl)-0-ethyl-N-isopropyl-phosphoro-amidate. (process a).

84 g of 0-(trans-2-carbethoxy-1-methyl-vinyl)-0-ethyl-N-isopropyl-phosphoro-amidate are dissolved in 1,200 cc of commercial hexane to which 2 percent of benzene have been added. The solution is exposed to a 70-watt UV lamp (300–580 nm; max. 366 nm) for 60 hours. During irradiation the solution is cooled with water and stirred by a weak stream of nitrogen. After irradiation is completed, the solvent is evaporated under a water jet vacuum and the residue subjected to fractional distillation under vacuum in a Vigreux column having a height of 28 cm. After a small first fraction, the trans form which has not been rearranged distils over. As soon as the distillation temperature reaches 100°, distillation is stopped and continued in a Vigreux column having a height of 8 cm. A small fraction is first obtained, which in accordance with paper chromatographic analysis contains about 90 percent of the cis isomer and 10 percent of the trans isomer of 0-(2-carbethoxy-1-methyl-vinyl)-0-ethyl-N-isopropyl-phosphoro-amidate. The higher boiling fraction contains the pure cis form having a boiling point of $110°/0.5.10^{-4}$. Yield : 29 g = 34 percent of the theory.

Analysis: $C_{11}H_{22}NO_5P$; Molecular weight: 279.3
 calculated: C 47.3 %; N 5.0 %; P 11.1 %
 found: C 46.2 %; N 5.2 %; P 10.7 %

Example 2: 0-(2-Carbomethoxy-1-methyl-vinyl)-0-methyl-N-methyl-phosphoro-amidate. (process b).

116.2 g of acetoacetic acid methyl ester are added, while stirring vigorously, to 700 ml of hexamethyl phosphoric acid triamide kept at a temperature of 5° to 0° by cooling, and subsequently 100 cc of a 40 percent aqueous caustic soda solution are added. 143.2 g of 0-methyl-N-methyl-phosphoramido chloridate are then added while cooling to −5°. The mixture is stirred at −5° for 15 minutes and the temperature is allowed to rise to 20° during the course of half an hour. The reaction mixture is kept at this temperature for 15 minutes and the solvent is subsequently distilled off under vacuum, the residue is taken up in benzene and washed with water. The benzene solution is subsequently dried, the benzene is evaporated and the residue distilled under high vacuum. After the first fractions at $30°-40°/3.10^{-5}$ mm of Hg and at $80°-90°/3.10^{-5}$ mm of Hg, 0-(2-carbomethoxy-1-methyl-vinyl)-0 -methyl-N-methylphosphoro-amidate distils over with a boiling point of $102°-105°/4.10^{-4}$ mm of Hg. The cis configuration may be ascertained with the NMR spectrum (NMR: Peak at 5.87; lack of peak at 5.4 [absence of trans isomer]).

Analysis: $C_7H_{14}NO_5P$; Molecular weight: 223
 calculated: C 37.4 %; N 6.3 %; P 13.9 %
 found: C 37.1 %; N 6.0 %; P 13.9 %

Example 3: O-(2-Carbomethoxy-1-methyl-vinyl)-o-methyl-N-(n-propyl)-phosphoro-amidate. (process b).

232 g of acetoacetic acid methyl ester are added to 400 cc of hexamethyl phosphoric acid triamide and subsequently 400 cc of water and 200 cc of a 40 percent aqueous caustic soda solution are added at 20°–30°. The mixture is stirred for 15 minutes and subsequently cooled to −10°. 343 g of O-methyl-N-n-propyl-phosphor amido chloridate are rapidly added with strong cooling. The reaction mixture is stirred at −5° for a further 15 minutes and the temperature is subsequently allowed to rise to +5° during the course of 15 minutes and stirring is then continued at room temperature for a further half hour. The reaction mixture is extracted 8 times with 300 cc of benzene, is washed twice with 100 cc of water, is subsequently dried and the solvent is evaporated. The reaction product is subjected to fractional distillation, as described in Example 1, whereby pure 0-(2-carbomethoxy-1-methyl-vinyl)-0-methyl-N-(n-propyl)-phosphoroamidate distils over at 115°–118°/$10^{-4}$ mm of Hg.

Analysis: $C_9H_{18}NO_5P$; Molecular weight: 251.2
calculated: C 43.0 %; N 5.6 %; P 12.3 %
found: C 42.5 %; N 5.2 %; P 11.5 %

Example 4: 0-(2-Carboisopropoxy-1-methyl-vinyl)0-methyl-N-(n-propyl)-phosphoro-amidate. (process b).

721 g of acetoacetic acid is isopropyl ester are added to 1.5 liters of dimethyl formamide, 1.5 litres of water and 500 cc of a 40 percent caustic soda solution at 20°. The reaction mixture is kept at 20° for 15 minutes, is then cooled to 0° and 858 g of 0-methyl-N-(n-propyl)-phosphoramido chloridate are added with strong cooling. The reaction mixture is kept at 0° while stirring for a further 15 minutes, the temperature is subsequently allowed to rise slowly to 20° and stirring is continued for half an hour. The reaction solution is subsequently extracted with petroleum ether. The petroleum ether is subsequently concentrated by evaporation to a volume of 3 litres and placed in a 5-litre separating funnel. A multiple separation is effected with four further separating funnels, whereby the stationary phase consists of 1.55 litres of petroleum ether and the mobile phase of 3.1 litres of water in each of the separating funnels 2 to 5. After shanking out 13 times, the aqueous phases in the 5th separating funnel are decanted. This phase contains the trans isomer of 0-(2-carboisopropoxy-1-methyl-vinyl)-0-methyl-N-(n-propyl)-phosphoro-amidate with only small amounts of the cis isomer, as ascertained by analytic examination. The pure cis compound is obtained by collecting the petroleum ether phases in the separating funnels and by chloroform extraction of the aqueous phases in the separating funnels and subsequent evaporation of the solvents by fractional distillation, as described in Example 1. It has a boiling point of 110°–118°/$2.10^{-5}$ and shows a peak at 5.85 ppm in the NMR spectrum.

Analysis: $C_{11}H_{22}NO_5P$; Molecular weight: 279.3
calculated: C 47.3 %; N 5.0 %; P 11.1 %
found: C 47.3 %; N 5.3 %; P 10.8 %

Example 5: 0-(2-Carbomethoxy-1-methyl-vinyl)-0-methyl-N-ethyl-phosphoro-amidate. (process d). -yl)-phosphorodichloridate A mixture of 332 g (2 mols) of acetoacetic acid methyl ester and 202 g (2 mols) of triethylamine is added at −10° during the course of 2 hours to 307 g (2 mols) of phosphorus oxychloride in 1 litre of toluene. The reaction mixture is subsequently stirred at 0° for 4 hours, is then filtered, the filtrate is concentrated by evaporation in a rotary evaporator at 30° and is distilled. After redistillation in a high vacuum the resulting 0-(1-methoxycarbonyl-1-propen-2-yl) hosphorodichloridate has a boiling point of 65°/0.01 mm of Hg.

32 g (1 mol) of methanol and 101 g (1 mol) of triethylamine are added at a temperature of 20° during the course of one hour to 233 g (1 mol) of 0-(1-methoxycarbonyl-1-propen-2-yl)-phosphoro-dichloridate in 600 cc of chlorobenzene and the mixture is stirred for a further half hour. A mixture of 1 mol of ethylamine and 1 mol of triethylamine is subsequently added at 0° during the course of half an hour. After the addition, stirring is continued at 20° for 15 to 20 hours and the precipitated triethylamine hydrochloride is then filtered off. The filtrate is subsequently concentrated by evaporation and the residue is distilled. The resulting 0-(2-carbomethoxy-1-methyl-vinyl)-0-methtl-N-ethyl-phosphoro-amidate has a boiling point of 98°–102° at $5.10^{-5}$ mm of Hg. $n_d^{20} = 1.4653$.

Analysis: $C_8H_{16}NO_5P$; Molecular weight: 237.2
Calculated: C 40.5 %; N 5.9 %; P 13.1 %
Found: C 40.7 %; N 6.1 %; P 13.0 %

Example 6: 0-(2-Carbomethoxy-1-methyl-vinyl)-0-methyl-N-ethyl-phosophoro-amidate. (process d).

A mixture of 116 g (1 mol) of acetoacetic acid methyl ester and 101 g (1 mol) of triethylamine in 200 cc of toluene is added at 0° during the course of 15 minutes to 153.5 g (1 mol) of phosphorus oxychloride, dissolved in 300 cc of toluene. The mixture is subsequently stirred at 0° for half an hour. The reaction mixture is then filtered and a mixture of 32 g (1 mol) of methanol and 101 g (1 mol) of triethylamine is then added to the filtrate at 20° during the course of one hour and while stirring is continued. A mixture of 45 g (1 mol) of ethylamine and 101 g (1 mol) of triethylamine in 200 cc of toluene is then added dropwise at 0° during the course of one hour while stirring and cooling the reaction mixture to 0°. The reaction mixture is then stirred at 0° for one hour and at room temperature for 15 hours. The precipitated triethylamine hydrochloride is subsequently filtered off and the filtrate concentrated by evporation. The product is suspended in 2.5 litres of water, the supernatant liquid is decanted from the insoluble material and the residue is again suspended in 2.5 litres of water. The reaction mixture is subsequently extracted five times with 20 cc of carbon tetrachloride and then 12 times with 250 cc of carbon tetrachloride.

The desired product in the aqueous phase may be subjected to a high vacuum distillation as described in Example 5, after evaporating the water.

Example 7: 0-(1-Chloro-1-methoxycarbonyl-1-propen-2-yl)-0-methyl-N-isopropyl-phosphoro-amidate. (process c).

171.5 g of 0-methyl-N-isopropyl-phosphoramido chloridate are added at 0° to 151 g (1 mol) of α-chloroacetoacetic acid methyl ester in 80 g (1 mol) of pyridine while stirring during the course of half an hour. The mixture is subsequently stirred at 0° for a further 60 hours. The reaction mixture is then taken up in 1 litre of ether and is washed thrice with a small amount of water. The ether solution is dried with magnesium sulphate, the ether is subsequently evaporated off and distillation is effected at a bath temperature of 100° and a pressure of 0.01 mm of Hg in order to remove small amounts of α-chloro-acetoacetic acid methyl ester. The residue is taken up in a mixture of 1 litre of petroleum ether and 200 cc of benzene and the solution is washed four times with 20 cc of water. The aqueous phase is extracted twice with benzene. The petroleum ether and benzene extracts are concentrated by evaporation and the resulting product is distilled in a high vacuum. 0-(1-chloro-methoxycarbonyl-1-propen-2-yl)-0-methyl-N-isopropyl-phosphoro-amidate has a boiling point of 104°–110° at a pressure of $10^{-4}$ mm of Hg. The relationship cis : trans isomer (in the crotonic acid radical) is 85 : 15.

Analysis: $C_9H_{17}ClNO_5P$; Molecular weight: 285.7
calc.: C 37,8 %; H 6,0 %; Cl 12,4 %; N 4,9 %; P 10,8 %
found: C 37,6 %; N 6,1 %; Cl 12,0 %; N 4,6 %; P 10,3 %

Example 8: 0-(1-Chloro-1-methoxycarbonyl-1-propen-2-yl)-0-methyl-N-ethyl-phosphoro-amidate. (process d).

resulting 0-(2-carbomethoxy-1-methyl-vinyl)-0-methyl-N-ethyl-phosphoro-amidate has a boiling point of 101° at a pressure of $10^{-5}$ mm of Hg.

The following compounds of general formula I may be obtained in a manner analogous to that described in Examples 1 to 9:

| Example | $R_1$ | $R_2$ | $R_3$ | X | Empirical formula | Mol weight | Process | Boiling point/ mm. of Hg | Calculated C | Calculated N | Calculated P | Found C | Found N | Found P |
|---|---|---|---|---|---|---|---|---|---|---|---|---|---|---|
| 10 | $CH_3$ | $C_2H_5$ | $C_2H_5$ | H | $C_9H_{18}NO_5P$ | 251.2 | a | $104$–$5°/0,1.10^{-4}$ | 43.0 | 5.6 | 12.3 | 43.0 | 5.7 | 12.4 |
| 11 | $CH_3$ | $C_2H_5$ | $nC_3H_7$ | H | $C_{10}H_{20}NO_5P$ | 256.3 | a | $108$–$112°/0,6.10^{-4}$ | 45.3 | 5.3 | 11.7 | 44.8 | 5.7 | 11.5 |
| 12 | $CH_3$ | $nC_3H_7$ | $C_2H_5$ | H | $C_{10}H_{20}NO_5P$ | 265.3 | a | $110°$–$2/1.10^{-4}$ | 45.3 | 5.3 | 11.7 | 44.5 | 5.4 | 11.4 |
| 13 | $CH_3$ | $nC_3H_7$ | $nC_3H_7$ | H | $C_{11}H_{22}NO_5P$ | 279.3 | a | $113$–$4°/2.10^{-4}$ | 47.3 | 5.0 | 11.1 | 47.3 | 4.8 | 10.8 |
| 14 | $C_2H_5$ | $iC_3H_7$ | $iC_3H_7$ | H | $C_{12}H_{24}NO_5P$ | 293.3 | a | $108°/1.10^{-4}$ | 49.2 | 4.8 | 10.8 | 48.3 | 4.7 | 11.3 |
| 15 | $CH_3$ | $CH_3$ | $C_2H_5$ | H | $C_8H_{16}NO_5P$ | 237.2 | d | $103$–$4°/1.10^{-3}$ | 40.5 | 5.9 | 13.1 | 39.9 | 6.1 | 12.6 |
| 16 | $CH_3$ | $CH_3$ | $nC_3H_7$ | H | $C_9H_{18}NO_5P$ | 251.2 | d | $116°/1.10^{-3}$ | 43.0 | 5.6 | 11.7 | 43.6 | 5.3 | 11.8 |
| 17 | $CH_3$ | $CH_3$ | $iC_3H_7$ | H | $C_9H_{18}NO_5P$ | 251.2 | d | $102$–$4°/1.10^{-3}$ | 43.0 | 5.6 | 11.7 | 42.7 | 5.7 | 11.9 |
| 18 | $CH_3$ | $C_2H_5$ | $iC_3H_7$ | H | $C_{10}H_{20}NO_5P$ | 265.3 | d | $108$–$9°/5.10^{-4}$ | 45.3 | 5.3 | 11.7 | 45.8 | 5.7 | 12.1 |
| 19 | $CH_3$ | $nC_3H_7$ | $CH_3$ | H | $C_9H_{18}NO_5P$ | 251.2 | d | $113$–$8°/3.10^{-4}$ | 43.0 | 5.6 | 11.7 | 42.5 | 5.7 | 12.3 |
| 20 | $CH_3$ | $iC_3H_7$ | $CH_3$ | H | $C_9H_{18}NO_5P$ | 251.2 | d | $107°/0.01$ | 43.0 | 5.6 | 11.7 | 43.2 | 6.0 | 11.7 |
| 21 | $CH_3$ | $iC_3H_7$ | $C_2H_5$ | H | $C_{10}H_{20}NO_5P$ | 265.3 | d | $102$–$5°/4.10^{-4}$ | 45.3 | 5.3 | 11.7 | 45.6 | 6.1 | 11.0 |
| 22 | $CH_3$ | $iC_3H_7$ | $nC_3H_7$ | H | $C_{11}H_{22}NO_5P$ | 279.3 | d | $112$–$5°/1.10^{-3}$ | 47.3 | 5.0 | 11.1 | 48.2 | 5.7 | 10.9 |
| 23 | $CH_3$ | $iC_3H_7$ | $iC_3H_7$ | H | $C_{11}H_{22}NO_5P$ | 279.3 | d | $119$–$21°/3.10^{-3}$ | 47.3 | 5.0 | 11.1 | 48.0 | 5.6 | 10.9 |
| 24 | $C_2H_5$ | $CH_3$ | $C_2H_5$ | H | $C_9H_{18}NO_5P$ | 251.2 | d | $104$–$5°/1.10^{-3}$ | 43.0 | 5.6 | 12.2 | 43.0 | 5.6 | 12.3 |
| 25 | $C_2H_5$ | $CH_3$ | $nC_3H_7$ | H | $C_{10}H_{20}NO_5P$ | 265.3 | d | $106$–$9°/1.10^{-3}$ | 45.3 | 5.3 | 11.7 | 46.0 | 5.5 | 11.0 |
| 26 | $C_2H_5$ | $CH_3$ | $iC_3H_7$ | H | $C_{10}H_{20}NO_5P$ | 265.3 | d | $109$–$10°/1.10^{-3}$ | 45.3 | 5.3 | 11.7 | 45.7 | 5.4 | 11.6 |
| 27 | $C_2H_5$ | $C_2H_5$ | $CH_3$ | H | $C_9H_{18}NO_5P$ | 251.2 | d | $94$–$5°/1.10^{-3}$ | 43.0 | 5.6 | 12.3 | 43.4 | 5.9 | 13.0 |
| 28 | $C_2H_5$ | $C_2H_5$ | $C_2H_5$ | H | $C_{10}H_{20}NO_5P$ | 265.3 | d | $102.3°/5.10^{-4}$ | 45.3 | 5.3 | 11.7 | 45.8 | 4.5 | 12.4 |
| 29 | $C_2H_5$ | $C_2H_5$ | $nC_3H_7$ | H | $C_{11}H_{22}NO_5P$ | 279.3 | d | $107$–$9°/1.10^{-3}$ | 47.3 | 5.0 | 11.1 | 47.9 | 4.9 | 11.8 |
| 30 | $C_2H_5$ | $nC_3H_7$ | $C_2H_5$ | H | $C_{11}H_{22}NO_5P$ | 279.3 | d | $112$–$4°/1.10^{-3}$ | 47.3 | 5.0 | 11.1 | 47.6 | 5.2 | 11.5 |
| 31 | $C_2H_5$ | $nC_3H_7$ | $nC_3H_7$ | H | $C_{12}H_{24}NO_5P$ | 293.3 | d | $117$–$20°/1.10^{-3}$ | 49.1 | 4.8 | 10.6 | 49.7 | 5.1 | 11.5 |
| 32 | $C_2H_5$ | $iC_3H_7$ | $CH_3$ | H | $C_{10}H_{20}NO_5P$ | 265.3 | d | $97°/1.10^{-3}$ | 45.3 | 5.3 | 11.7 | 45.6 | 5.7 | 11.7 |
| 33 | $C_2H_5$ | $iC_3H_7$ | $nC_3H_7$ | H | $C_{12}H_{24}NO_5P$ | 293.3 | d | $105°/5.10^{-4}$ | 49.1 | 4.8 | 10.6 | 49.7 | 4.8 | 11.2 |
| 34 | $CH_3$ | $C_2H_5$ | $C_2H_5$ | Cl | $C_9H_{17}ClNO_5P$ | 285.7 | d | $114°/3.10^{-4}$ | 37.8 | 4.9 | 10.8 | 37.8 | 5.2 | 10.8 |
| 35 | $CH_3$ | $iC_3H_7$ | $iC_3H_7$ | Cl | $C_{11}H_{21}ClNO_5P$ | 313.7 | d | $110$–$2°/3.10^{-4}$ | 42.2 | 4.5 | 9.9 | 42.0 | 4.7 | 10.1 |

A mixture of 151 g (1 mol) of α-chloro-aceto-acetic acid methyl ester and 102 g (1 mol) of triethylamine is added at −5° to 153.5 g (1 mol) of phosphorus oxychloride in 400 cc of toluene during the course of 2 hours. The reaction mixture is subsequently stirred at 0° for 3 hours, is then filtered and the precipitate is treated with 400 cc of toluene. 32.5 g (1 mol) of methanol and 102 g (1 mol) of triethylamine are added to the filtrate at 20° during the course of ½ hour. The reaction mixture is subsequently stirred at room temperature for 1 hour, is then cooled to 0° and a solution of 45.1 g (1 mol) of ethylamine and 102 g (1 mol) of triethylamine in 200 cc of chloroform is added at the same temperature during the course of ½ hour. The reaction mixture is subsequently stirred at 0° for one hour and at 20° for 15 hours, is then filtered, concentrated by evaporation and distilled. The resulting 0-(1-chloro-1-methoxycarbonyl-1-propen-2-yl)-0-methyl-N-ethyl-phosphoro-amidate has a boiling point of 110°–111° at a pressure of $5.10^{-5}$ mm of Hg. The relationship cis : trans isomer (in the crotonic acid radical) is 85 : 15 in the compound obtained.

Analysis : $C_8H_{15}ClNO_5P$; Molecular weight: 271.6
calculated: C 35.4 %; H 5.6 %; Cl 13.1 %; N 5.2 %; P 11.4 %
found: C 35.1 %; H 5.4 %; Cl 13.1 %; N 4.9 %; P 11.0 %

Example 9: 0-(2-Carbomethoxy-1-methyl-vinyl)-0-methyl-N-ethyl-phosphoro-amidate. (process e).

48.5 g of 0-(1-methoxycarbonyl-1-propen-2-yl)-N-ethyl-phosphoramido chloridate dissolved in 100 cc of chloroform are added during the course of 1 hour to a mixture of 6.4 g of methanol and 21 g of triethylamine. The reaction mixture is stirred at 20° for 70 hours, is subsequently washed twice with 20 cc of water, is dried with sodium sulphate, the solvent is subsequently removed by evaporation and the residue is distilled. The EXAMPLE 36: (Compounds of formula Ia)

The compounds of formula Ia, having a trans configuration in the crotonic acid radical, may be produced as follows 1 gram atom of sodium metal is pulverized in anhydrous toluene and 1 mol of acetoacetic acid alkyl ester is subsequently added dropwise at 40°–60°C. After the reaction is completed, the reaction mixture is cooled to 0° and 1 mol of a compound of formula II is added dropwise during the course of 10 to 20 minutes, providing the necessary cooling so that the temperature does not exceed 20°–30°. The mixture is subsequently stirred at 30°–50° for a further 15 to 30 minutes, is then cooled to 10°–20°, shaken out with a small amount of water, the separated toluene solution is dried with sodium sulphate and the solvent is distilled off on a water bath under a water jet vacuum. The crude phosphoric acid amide ester, having a trans configuration in the crotonic acid radical and obtained with a yield of 70 to 95 percent, may be further purified by distillation under a high vacuum.

The compounds of general formula II, used as starting materials, may be produced as follows:

A solution of 1 mol of triethylamine and 1 mol of the amine $R_2$—$NH_2$, in which $R_2$ signifies an alkyl radical of one to five carbon atoms, in ethyl ether or chloroform is added at −5° to 0° to 1 mol of the compound $R_1$—O—P(O)$Cl_2$, in which $R_1$ signifies an alkyl radical of one to five carbon atoms, dissolved in ethyl ether or chloroform. After the reaction is completed, the solution is washed for a short time with ice water, is then dried, and the solvent is distilled off in a vacuum. Since most of the resulting compounds cannot be distilled, the evaporation residue is used for the next reaction without further purification.

The compounds of general formula VIII may, for example, be produced as follows:

58.5 g (0.25 moles) of 0-(1-methyoxycarbonyl-1-propen-2-yl)-phosphoro dichloridate are dissolved in 300 cc of chlorobenzene. A mixture of 7.8 g (0.25 moles) of methylamine in 30 g of chloroform and 25.5 g (0.25 moles) of triethylamine, and 100 cc of chlorobenzene are added dropwise to this solution at 20° during the course of ½ hour. After the addition is completed, the mixture is stirred for one hour, the precipitated triethylamine hydrochloride is filtered off, the solvent is evaporated and the resulting 0-(1-methoxycarbonyl-1-propen-2-yl)-N-methyl-phosphoramide chloridate is distilled under high vacuum.

What is claimed is:

1. A compound of formula:

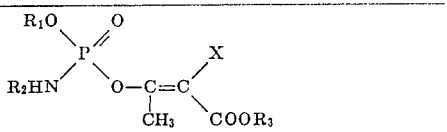

in which $R_1$, $R_2$ and $R_3$ which may be the same or different each represent alkyl containing from one to five carbon atoms, and X represents a hydrogen atom, and in which the —$CH_3$ is cis to the —$COOR_3$ in the crotonic acid moiety.

2. A compound as claimed in claim 1 wherein $R_1$ is ethyl, $R_2$ is isopropyl and $R_3$ is ethyl.

3. A compound as claimed in claim 1, wherein $R_1$ is methyl, $R_2$ is methyl and $R_3$ is methyl.

4. A compound as claimed in claim 1, wherein $R_1$ is methyl, $R_2$ is n-propyl and $R_3$ is methyl.

5. A compound as claimed in claim 1, wherein $R_1$ is methyl, $R_2$ is n-propyl and $R_3$ is isopropyl.

6. A compound as claimed in claim 1, wherein $R_1$ is methyl, $R_2$ is ethyl and $R_3$ is methyl.

7. A compound as claimed in claim 1, wherein $R_1$ is methyl, $R_2$ is isopropyl and $R_3$ is methyl.

8. A compound as claimed in claim 1, wherein $R_1$ is methyl, $R_2$ is ethyl and $R_3$ is ethyl.

9. A compound as claimed in claim 1, wherein $R_1$ is methyl, $R_2$ is ethyl and $R_3$ is n-propyl.

10. A compound as claimed in claim 1, wherein $R_1$ is methyl, $R_2$ is n-propyl and $R_3$ is ethyl.

11. A compound as claimed in claim 1, wherein $R_1$ is methyl, $R_2$ is n-propyl and $R_3$ is n-propyl.

12. A compound as claimed in claim 1, wherein $R_1$ is ethyl, $R_2$ is isopropyl and $R_3$ is isopropyl.

13. A compound as claimed in claim 1, wherein $R_1$ is methyl, $R_2$ is methyl and $R_3$ is ethyl.

14. A compound as claimed in claim 1, wherein $R_1$ is methyl, $R_2$ is methyl and $R_3$ is n-propyl.

15. A compound as claimed in claim 1, wherein $R_1$ is methyl, $R_2$ is methyl and $R_3$ is isopropyl.

16. A compound as claimed in claim 1, wherein $R_1$ is methyl, $R_2$ is ethyl and $R_3$ is isopropyl.

17. A compound as claimed in claim 1, wherein $R_1$ is methyl, $R_2$ is isopropyl and $R_3$ is ethyl.

18. A compound as claimed in claim 1, wherein $R_1$ is methyl, $R_2$ is isopropyl and $R_3$ is n-propyl.

19. A compound as claimed in claim 1, wherein $R_1$ is methyl, $R_2$ is isopropyl and $R_3$ is isopropyl.

20. A compound as claimed in claim 1, wherein $R_1$ is ethyl, $R_2$ is methyl and $R_3$ is ethyl.

21. A compound as claimed in claim 1, wherein $R_1$ is ethyl, $R_2$ is methyl and $R_3$ is n-propyl.

22. A compound as claimed in claim 1, wherein $R_1$ is ethyl, $R_2$ is methyl and $R_3$ is isopropyl.

23. A compound as claimed in claim 1, wherein $R_1$ is ethyl, $R_2$ is ethyl and $R_3$ is methyl.

24. A compound as claimed in claim 1, wherein $R_1$ is ethyl, $R_2$ is ethyl and $R_3$ is ethyl.

25. A compound as claimed in claim 1, wherein $R_1$ is ethyl, $R_2$ is ethyl and $R_3$ is n-propyl.

26. A compound as claimed in claim 1, wherein $R_1$ is ethyl, $R_2$ is n-propyl and $R_3$ is ethyl.

27. A compound as claimed in claim 1, wherein $R_1$ is ethyl, $R_2$ is n-propyl and $R_3$ is n-propyl.

28. A compound as claimed in claim 1, wherein $R_1$ is ethyl, $R_2$ is isopropyl and $R_3$ is methyl.

29. A compound as claimed in claim 1, wherein $R_1$ is ethyl, $R_2$ is isopropyl and $R_3$ is n-propyl.

* * * * *